UNITED STATES PATENT OFFICE.

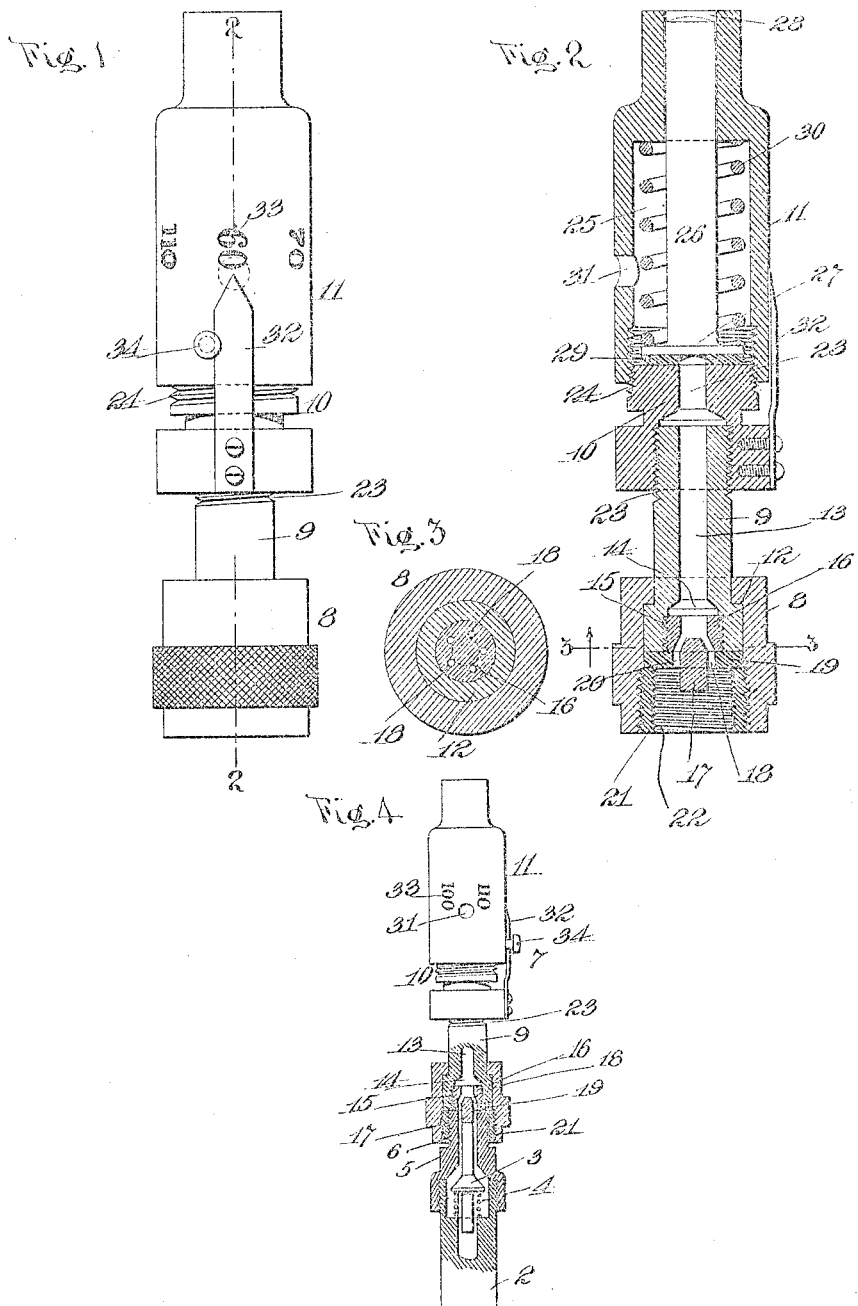

WALTER H. VAN WINKLE, OF NEWARK, NEW JERSEY.

DEVICE FOR PREVENTING EXCESSIVE PRESSURE IN PNEUMATIC TIRES.

1,082,182.

Specification of Letters Patent.   Patented Dec. 23, 1913.

Application filed July 15, 1911. Serial No. 638,634.

*To all whom it may concern:*

Be it known that I, WALTER H. VAN WINKLE, a citizen of the United States, and a resident of the city of Newark, county of Essex, and State of New Jersey, have invented a certain new and useful Device for Preventing Excessive Pressure in Pneumatic Tires, of which the following is a specification.

The object I have in view is to produce a device by means of which the pressure of air in pneumatic tires may be kept within certain defined and ascertained maximum limits. Pneumatic tires, particularly for use in automobiles, when pumped to a certain pressure have a tendency, in use, to cause the pressure of air to exceed the initial pressure, producing explosions and blow-outs. This increase in pressure may be caused by the heat of the atmosphere, the alternate compression and expansion of the air in the tire during the traveling of the vehicle, and the heat caused by the friction of the shoe on the road. So far as I am aware, no provision has heretofore been made for keeping the air under pressure within the tire at a certain maximum pressure.

The before enumerated and other objects will appear from the following specification and accompanying drawings, considered together or separately.

In the drawings, Figure 1 is a front elevation of a device embodying my invention. Fig. 2 is a section on the line 2—2 of Fig. 1. Fig. 3 is a section on the line 3—3 of Fig. 2, looking in the direction of the arrow; and Fig. 4 is a view, partly in section, of the same device, applied to the valve of a pneumatic tire, the valve being shown in section.

In all of the views, like parts are designated by the same reference characters.

In carrying out my invention, I provide a relief valve which is held upon its seat by means of a spring. The tension on the spring may be adjusted so that the valve will remain seated until a definite and predetermined pressure exists within the tire. The device is adapted to be placed on the valve nipple, and is preferably attached by means of the same threads which hold the ordinary cap, and which also serve as a means of attachment to a pump, my device taking the place of such a cap.

Referring to Figs. 4, the tire 1 has connected to it the usual valve stem 2, the valve 3, with spring 4, for seating the same. On the stem 2 is attached a nipple 5. This nipple is provided with external screw-threads 6, for attachment of the pump and also of my device. The device, indicated by the character 7, comprises an attaching nut 8, a neck 9, a valve seat 10 and a valve casing 11. The attaching nut 8 is secured to the neck 9 by means of the shoulder 12. The neck is provided with a central passage 13, extending throughout its length. The lower part of this passage has a counter-bore 14, and is threaded at 15. A plug 16 is screwed in these threads. This plug is provided with a centrally aligned finger 17, said finger extending below the rest of the plug. Surrounding the finger, communication is made to the center bore 13, by a plurality of passages 18. A washer 19, of flexible material, such as leather, rests against the lower face of the neck 9 and the plug 16, said washer having a central opening 20, serving as a passage of communication from the outside, through the opening 18. A bushing 21 engages within the threads on the inner face of the attaching nut and serves to hold the washer in place. The inner surface of this bushing is provided with threads 22, said threads engaging with the threads 6 on the stem 2.

This structure as described permits of ready attachment to the valve stem. The projection 17 engages with the outer end of the valve 3, and pushes it away from its seat, keeping the valve open when the device is in place. The upper end of the neck 9 is provided with screw-threads 23, for attachment of the valve seat 10. The neck 9 and valve seat are made separate, so that the attaching nut 8 can be put in place, but if desired, the attaching nut can be made integral with the neck, and in this event, the valve seat can also be made integral with the neck. The valve seat has a center bore 25, in alinement with the center bore 13 of the neck. Its upper end is provided with threads 24, for attachment to the valve casing 11, said valve casing having threads, as shown, on its lower inner end, for attachment to the threads 24. The valve body comprises an enlarged chamber 26. In this chamber is a valve member 26, having a stem and an enlarged head 27. The stem 26 passes through and is guided in an opening 28 in the valve casing. The enlarged head 27 rests upon a seat 29 of suitable ible material, such as leather. A spiral spring 30 engages between the head 27 of the valve and the upper end of the chamber 25. A port 31 permits escape of air from the chamber. The tension on the spring is adjusted by changing the relative positions of the valve casing and the valve seat, the casing being screwed upon the seat. For the purpose of indicating the pressure of the spring on the valve, a finger 32 secured to the valve seat has its pointed end adjacent to the barrel of the valve casing. This casing is provided at this point with suitable media 33, indicating the pressure in pounds per square inch at which the valve will open when the casing is in different positions and the spring 30 exerts different pressures upon the valve member. A stop 34 prevents rotation through more than one revolution.

The device is adapted to be attached to the valve stem of the tire after the latter has been pumped to the desired degree. Before being attached, the tension on the spring 30 is adjusted to the desired amount or else at maximum. If it is desired, it may be adjusted to the desired maximum after it is in place. The valve body is turned so that the proper tension is put upon the spring, as shown by the position of the pointer 32 and indicating media 33. If the pressure in the tire be greater than the pressure of the valve 26 upon its seat, the latter will be lifted, allowing the air in the tire to escape until the spring seats the valve. When the tire is in use, should the pressure increase, the air will harmlessly pass out, lifting the valve 26, without any injury to the tire. By this means blow-outs and explosions caused by excessive pressure in the tire are prevented.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:—

A relief valve for pneumatic tires, comprising an attaching nut, a finger carried thereby which is adapted to engage with and open the valve in the valve stem of the tire, a neck removably attached to said nut, a valve seat removably attached to said neck, a valve member coöperating with said valve seat, a casing inclosing the valve member and having a threaded connection with said valve seat, a spring within the said casing and engaging with the valve member, a pointer secured to the valve seat and lying over the outside of said casing to indicate the position of the latter, and a stop on the casing adapted to be engaged by the pointer and limit the extent of rotary movement of the casing to one revolution.

This specification signed and witnessed this fourteenth day of July, 1911.

WALTER H. VAN WINKLE.

Witnesses:
 FLORENCE B. HARDY,
 W. H. VAN WINKLE, Jr.